US008645453B2

(12) United States Patent
Cheng et al.

(10) Patent No.: US 8,645,453 B2
(45) Date of Patent: Feb. 4, 2014

(54) METHOD AND SYSTEM OF PROCESSING COOKIES ACROSS DOMAINS

(75) Inventors: Limin Cheng, Hangzhou (CN); Qibu Luo, Hangzhou (CN); Mu Li, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 231 days.

(21) Appl. No.: 12/674,721

(22) PCT Filed: Jan. 7, 2010

(86) PCT No.: PCT/US2010/020360
§ 371 (c)(1),
(2), (4) Date: Feb. 23, 2010

(87) PCT Pub. No.: WO2010/096211
PCT Pub. Date: Aug. 26, 2010

(65) Prior Publication Data
US 2012/0011262 A1 Jan. 12, 2012

(30) Foreign Application Priority Data
Feb. 17, 2009 (CN) .......................... 2009 1 0007729

(51) Int. Cl.
*G06F 15/16* (2006.01)
(52) U.S. Cl.
USPC ...................................................... 709/201
(58) Field of Classification Search
None
See application file for complete search history.

(56) References Cited

U.S. PATENT DOCUMENTS

| | | | |
|---|---|---|---|
| 7,188,181 B1 | 3/2007 | Squier et al. | |
| 2003/0037131 A1 | 2/2003 | Verma | |
| 2005/0216582 A1 | 9/2005 | Toomey et al. | |
| 2006/0265495 A1* | 11/2006 | Butler et al. | 709/224 |
| 2006/0282660 A1* | 12/2006 | Varghese et al. | 713/155 |
| 2007/0005606 A1 | 1/2007 | Ganesan et al. | |
| 2008/0027824 A1 | 1/2008 | Callaghan et al. | |
| 2008/0052392 A1 | 2/2008 | Webster et al. | |
| 2008/0072301 A1 | 3/2008 | Chia et al. | |
| 2008/0092058 A1 | 4/2008 | Afergan et al. | |
| 2008/0244719 A1 | 10/2008 | Hariya et al. | |
| 2008/0270527 A1 | 10/2008 | Krabach et al. | |
| 2008/0281921 A1 | 11/2008 | Hunt | |
| 2009/0024737 A1 | 1/2009 | Goldspink et al. | |
| 2009/0024748 A1 | 1/2009 | Goldspink et al. | |
| 2009/0055908 A1 | 2/2009 | Rapoport | |

OTHER PUBLICATIONS

The Chinese Office Action mailed Jan. 20, 2011 for Chinese patent application No. 200910007729.0, a counterpart foreing application of U.S. Appl. No. 12/674,721, 4 pages.

(Continued)

*Primary Examiner* — Scott Christensen
(74) *Attorney, Agent, or Firm* — Lee & Hayes, PLLC

(57) ABSTRACT

Method and system of processing cross-domain cookies in order to allow a first website to access a cookie of a second website are provided. In one aspect, a method includes: providing a flash cookie of a first website in a user's local computer; reading an ordinary cookie of a second website that is stored in the user's local computer; and writing the ordinary cookie of the second website into the flash cookie of the first website. Based on this method, it is achievable to access and store cookies across domains in the user's local computer. Accordingly, the method enables e-commerce websites to have a more comprehensive collection of user information to provide more reliable references for the e-commerce websites to analyze user information.

20 Claims, 2 Drawing Sheets

(56) References Cited

OTHER PUBLICATIONS

Wang et al., "Research of Web Based Cross Site Scripting," Computer Engineering and Design, vol. 25, No. 8, Aug. 2004, pp. 1317-1319.

The Chinese Office Action mailed Jan. 20, 2011 for Chinese patent application No. 200910007729.0, a counterpart foreing application of U.S. Appl. No. 12/674,721, 5 pages.

The Chinese Office Action mailed Jan. 5, 2012 for Chinese patent application No. 200910007729.0, a counterpart foreing application of U.S. Appl. No. 12/674,721, 4 pages.

* cited by examiner

METHOD AND SYSTEM OF PROCESSING COOKIES ACROSS DOMAINS

RELATED APPLICATIONS

This application is a national stage application of international patent application PCT/US10/20360, filed Jan. 7, 2010, entitled "METHOD AND SYSTEM OF PROCESSING COOKIES ACROSS DOMAINS", which claims priority benefit from Chinese patent application No. 200910007729.0, filed Feb. 17, 2009, entitled "METHOD AND SYSTEM OF PROCESSING COOKIE ACROSS DOMAINS", which applications are hereby incorporated in their entirety by reference.

TECHNICAL FIELD

The present disclosure relates to data storage technologies, and particularly to methods and systems of processing cookies across domains.

BACKGROUND

Generally speaking, the technology related to Internet browser cookies is relatively simple. The use of cookies makes it easy for users to browse web pages. Nearly all mainstream website designers use cookies for providing a better browsing environment to website users and for collecting more accurate information of website visitors. Practically, a cookie is a piece of text stored in a user computer by a web server. Cookies allow a website to save information in the user computer for later retrieval.

Specifically, cookies allow the website server to store data in a hard drive or a cache of a user's computer, or read data from the user's computer. For example, when a user browses a certain website, the web server providing that website may place a very small text file in that user computer. The file may record such information as the user's ID, password, browsed web pages and respective browsing durations. This text file is referred to as a cookie. When the user visits this website again, the website reads the cookie in the user computer to learn of relevant information about the user. Based on this information, operations such as displaying a banner welcoming the user on the web page or allowing login directly without requiring the user to enter user ID and password may be performed accordingly. Essentially, a cookie may be considered as one's identification card. However, it should be noted that cookies are not executable and cannot spread viruses, being uniquely possessed by a given user. A web server can only obtain website-related information that the web server placed in the user computer previously, but is unable to obtain information about other websites from the cookie files of those other websites.

Generally, cookies have the following characteristics:
A) Cookies are strictly isolated according to domain names.
B) Cookies can be cleared easily.
C) Cookies are browser-specific.
D) Cookies are each valid for a given period of time.

With the advent of electronic commerce, or e-commerce, investigation of information of user activities for the purpose of satisfying user needs is particularly important for website development from the perspectives of e-commerce websites. Cookies, being a tool of acquiring user information, have therefore become extremely important for e-commerce websites. However, the technical schemes of tracking and analyzing user activities using cookies with existing technologies tend to have the following problems:

1) The existence of any given cookie tends to be short because cookies are usually deleted on the user's end. Cookies may thus be constantly re-assigned to the same user, leading to fragmentation of data associated with user activities and severely affected analysis of user activities.

2) As cookies are isolated according to domain names, cookies cannot be placed under other third-party domain names.

Due to the above reasons, information of user activities obtained through cookies by e-commerce websites tends to be incomplete. Furthermore, the website-visiting behavior of a user may be easily segmented to be the behavior of multiple users, thus making analysis of user activities more complicated and resulting in inaccurate analysis results. To change this situation, the present disclosure provides a method and a system for accessing and storing cookies across domains in a user computer in order to provide more reliable references for analysis of user information by e-commerce websites.

SUMMARY

An objective of this disclosure is to describe a method of processing cookies across domains in order to allow a first website to access a cookie of a second website. This objective can be achieved according to the following technical scheme.

On the user's local computer, a flash cookie of the first website is set up, or established; an ordinary cookie of the second website that is stored in the user's local computer is read; and the ordinary cookie of the second website is written into the flash cookie of the first website.

Preferably, prior to establishing the flash cookie of the first website, a resource supply module is further established. Related program resources are downloaded into the user's local computer by this module.

Preferably, the resource supply module is established in the first website or in a third website that is related to the first website.

Preferably, reading the ordinary cookie of the second website that is stored in the user's local computer further includes: establishing a flash cookie of the third website in the user's local computer; storing the ordinary cookie of the second website that is stored in the user's local computer into the flash cookie of the third website; and reading the ordinary cookie of the second website from the flash cookie of the third website.

Preferably, writing the ordinary cookie of the second website into the flash cookie of the third website or the first website further includes: comparing the value of the ordinary cookie of the second website with the value of an original cookie of the second website that has been stored in the flash cookie of the third website or the first website; if the value of the ordinary cookie of the second website is different from the value of the original cookie of the second website that has been stored in the flash cookie of the third website or the first website, the ordinary cookie of the second website is written into the flash cookie of the third website or the first website to overwrite the original cookie value; if the value of the ordinary cookie of the second website is the same as the value of the original cookie of the second website that has been stored in the flash cookie of the third website or the first website, writing is skipped.

Preferably, establishing the flash cookie and reading and writing the ordinary cookie can be accomplished through the related program resources.

Preferably, the related program resources include programs written in JavaScript and programs written in Flash.

Another objective of this disclosure is to describe a system of processing cookies across domains.

This objective can be achieved according to the following technical scheme.

A network system, which processes cross-domain cookies, includes at least a first website and a second website. The first website provides program resource download and downloads related program resources into a user computer when the user visits the first website. Through the program resource, a flash cookie of the first website is established in the user computer. Then, an ordinary cookie of the second website that is stored in the user computer is written into the flash cookie of the first website.

Preferably, the system further includes a third website that is related to the first website, which is used to establish a flash cookie of the third website in the user computer, reading the ordinary cookie of the second website from the flash cookie of the first cookie, and writing the ordinary cookie of the second website into the flash cookie of the third website.

This disclosure further describes a module for processing cookies across domains. This module includes at least the following: a resource supply unit, which is used to provide related program resources; a logic control unit, which is used to determine whether a user's local computer supports a scheme of flash cookies and whether the user's local computer requires use of a main functional unit; and the main functional unit, which establishes a flash cookie in the user's local computer using the program resources, reads an ordinary cookie in the user's local computer, and writes the ordinary cookie into the flash cookie that has been established.

The present disclosure is not limited to the above characteristics and advantages. It is believed that, after reading the following detailed description and referencing the accompanying figures, one of ordinary skills in the art can understand other characteristics and advantages.

DESCRIPTION OF DRAWINGS

The present disclosure is described in further details with reference to the preferred embodiments and accompanying figures.

DETAILED DESCRIPTION

Figure 1:
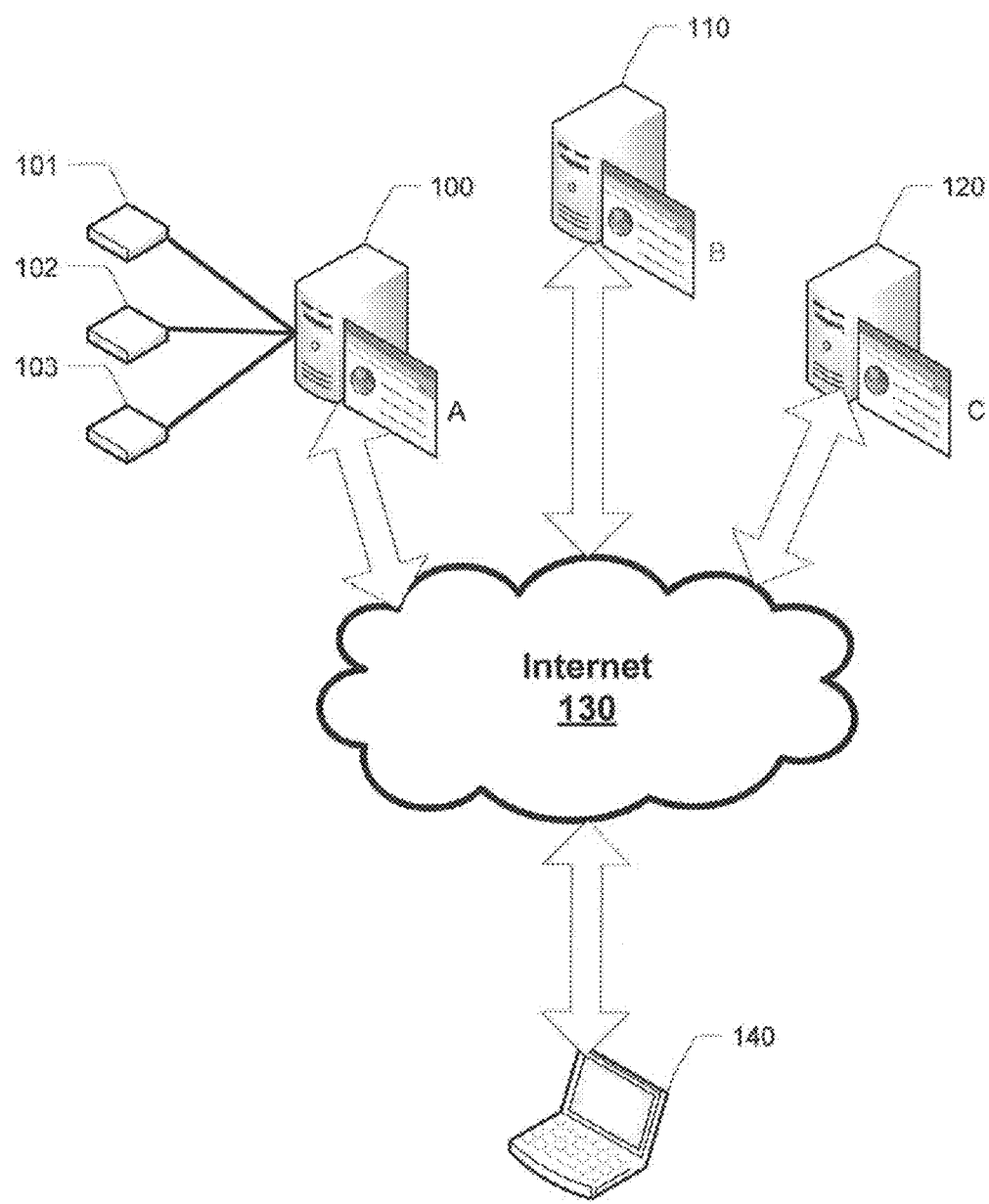
FIG. 1 shows a schematic diagram of an exemplary system in accordance with the present disclosure.

Before expounding on the exemplary embodiments of the present disclosure, certain terminologies used in this disclosure are explained first as follows:

Cookie—This is a technology that allows a website server to store data in a hard drive or a cache of a user computer, or to read data from a user computer. Each website server can only save a cookie belonging to its own domain in the user computer, with the cookie being allowed to be read only by website servers of that domain through a browser. However, by analyzing the cookie format, other tools and programs may be able to read the cookie.

JavaScript language—It is the most widely used script language on the Internet and may be embedded in a web page for execution. The JavaScript language can only place a cookie under the domain name of the present web page.

Flash—It is a web multimedia platform developed by Macromedia. A file using Flash has ".swf" as extension name. To run a flash file in .swf format, the web browser of a user only needs to have the flash player plug-in installed. The flash player plug-in is one of the most widely used programs in the world. Furthermore, flash can store data in a local cache of the user computer. The cached data belongs to a domain to which the .swf file belongs and can and only be read and operated by the domain to which the .swf file belongs. Moreover, flash is able to interact with external JavaScript language.

Flash cookie—A flash cookie is a data file created in the user computer by a website visited by the user, and is primarily implemented using SharedObject types in the flash programs. Conventionally, the flash cookie uses functions of SharedObject types of flash to simulate cookie functions. SharedObject types are very useful functions added in Flash MX and have functions similar to those of a cookie, allowing a website designer to store a small piece of information in a client. Some user-friendly functions such as, for example, the recording of view count of customers, automatic logins of the customers and even the save function in game development, can be easily implemented using SharedObject. Currently, SharedObject is the only method used by Macromedia Flash Player to store data in a client and has a data storage method similar to that of cookies, with the stored data being readable only by its flash creator. Benefits of flash cookies include their difficulties to be deleted by users and the capability to allow a large amount of data to be written. One disadvantage is that if the user blocks flash, then flash cookies cannot be used anymore. In a number of situations, flash cookies can improve the user's web browsing experience. The website can write a flash cookie in the user computer using the shared object. When the user visits the website again, this website will load the cookie and its information. Accordingly, it will provide the user a more personalized experience. For example, the user can choose to allow the website to memorize the registration name. This information is saved in the cookie, and is retrieved when the user visits again, allowing the website to display the user's name in the log-in field.

The exemplary environment may be the Internet. As shown in FIG. 1, there are two e-commerce websites in the network of the exemplary embodiment, namely e-commerce websites A and C, hosted by servers 100 and 120, respectively. There is also an ordinary website B, hosted by server 110, as well as at least one client computer 140, which is the local computer of a user. The e-commerce websites A and C are affiliated. Specifically, they are two separate websites belonging to one e-commerce company. As mentioned above, in the cookie there exists a large amount of user preference information, which is very valuable to the e-commerce company. According to the existing technology, e-commerce websites A and C can only read their own cookies stored in a user computer but not the information of the other website.

The objective of the sample implementation is to allow websites A and C to obtain a large amount of user-related information by reading the cookies of each other. This will provide important references for websites A and C for executing management strategies. Website B is an example of many other websites.

Specifically, in the exemplary embodiment, website A will read an ordinary cookie of website B from the user's local computer and save information of this cookie in a local flash cookie of the user. This will enable website A to read from this cookie whenever needed. At the same time, for the convenience of its affiliated website C, the program resource provided by website A can also set up, or establish, a flash cookie in the client computer 140 for website C and save website B's cookie into website C's flash cookie. For instance, website B's cookie can be stored into website C's flash cookie with the help of website A's flash cookie. This way, website A's affiliated website C can also achieve the goal of storing cross-domain cookies, thus allowing affiliated websites A and C to share data in a certain sense.

In fact, based on this technique, one can even save any one website's cookie into another website's flash cookie. For example, e-commerce website C's cookie may be saved into website B's flash cookie in the client computer 140. Alternatively, both cookies of website B and e-commerce website C may be saved into the flash cookie of e-commerce website A. These storage methods follow the same principle. For illustrative purpose, website B's cookie is saved under e-commerce website C's domain.

The prerequisite for implementing embodiments of the present disclosure is that the client computer must support the scheme of flash cookies. Generally, if the client computer does not specifically block flash, then the user computer must be supporting the scheme of flash cookies.

E-commerce website A in FIG. 1 includes resource supply module 101, logic control module 102, and main functional module 103. The resource supply module 101 provides resource download service (e.g., program resource download) when the client computer 140 visits e-commerce website A. Practically, in the exemplary embodiment, if the settings of the client computer 140 can further support the scheme of flash cookies when the client computer 140 visits e-commerce website A, then the resource supply module 101 can download a JavaScript program AC.JS and a flash program AC.SWF into the client computer 140. These two programs are used to enable interaction between the website A and the client computer 140, and complete the function of storing cookies in the client computer 140 using SharedObject.

While the user of the local computer 140 visits the website A, the logic control module 102 determines whether the client (i.e., the client computer 140) supports flash cookie scheme. In one embodiment, as the JavaScript language can be used as a tool for interaction between the user and the website, when client computer 140 visits the e-commerce website A, the e-commerce website A can use the logic control module 102 with JavaScript to analyze the user's local web browser setting to evaluate whether the flash cookie scheme is supported by the client computer 140. If the client computer 140 supports flash cookie, then the logic control module 102 will download AC.JS and AC.SWF from resource supply module 101 onto the client computer 140. If the client computer 140 does not support flash cookie, no download will take place and the process terminates.

In addition, the logic control module 102 is further used to determine whether the client computer needs to use the main functional module 103. In one embodiment, when the client computer does not support flash cookie, the main functional module 103 is not needed. However, if the client computer supports flash cookie and needs to use AC.JS and AC.SWF to store cookies, then the main functional module 103 is used.

The main functional module 103 performs the entire system's management function and carries out business processing. In one embodiment, the main functional module 103 can decide, based on a result determined by the logic control module 102, whether to run AC.JS and AC.SWF programs to establish a flash cookie in the user client, to read the other website's ordinary cookie and to save it in the flash cookie.

One of ordinary skills in the art will appreciate that the above-mentioned resource supply module, logical control module and main functional module are divided by their functions in order to be described more easily. They can be completely implemented by hardware or software or be a combination of hardware and software.

Furthermore, the client computer 140 can visit e-commerce website A, e-commerce website B and e-commerce website C through the Internet 130.

Figure 2:
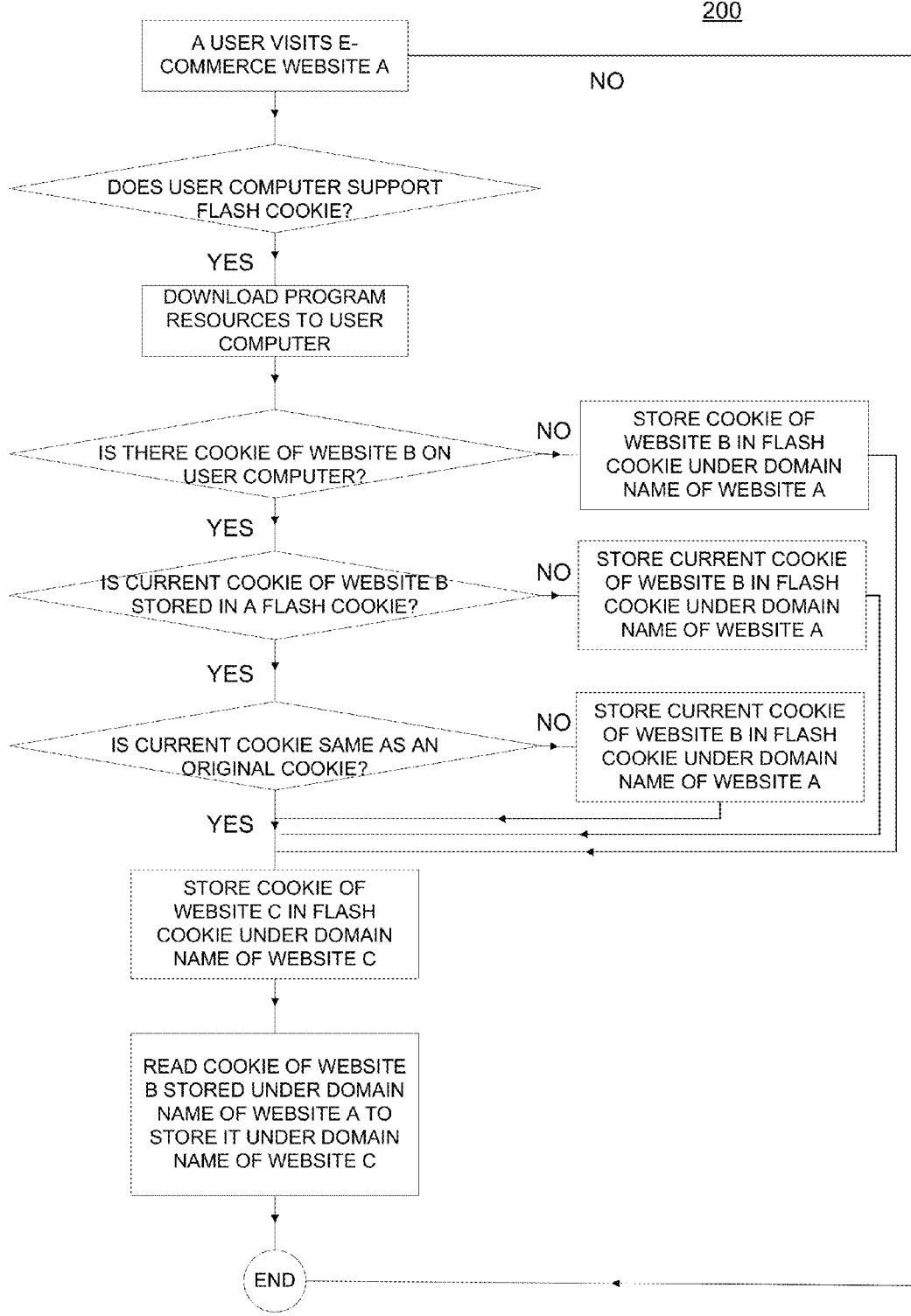
FIG. 2 shows a flow chart of an exemplary method in accordance with the present disclosure.

FIG. 2 illustrates a process 200 of storing cross-domain cookies in accordance with the present disclosure. The process 200 is directed to saving a cookie of e-commerce website B into a flash cookie of e-commerce website C in the client computer 140. The e-commerce website A is used to provide the resource download services.

Generally, the e-commerce website A first establishes a resource supply module 101. After the user of the client computer 140 visits e-commerce website A or clicks on a link to connect to a hyperlink of the e-commerce website A, the e-commerce website A can use JavaScript to analyze settings related to flash in the client computer 140. If the client computer 140 supports flash cookie, then the flash program AC.SWF and JavaScript AC.JS will automatically be downloaded to the local hard drive of the client computer 140. Otherwise, the process 200 will terminate. It should be noted that the main purpose of downloading the flash AC.SWF and Java script AC.JS is to provide tools necessary for subsequent procedures. On the other hand, the main functional module 103 can simultaneously set up website A's flash cookie in the client computer 140 because the client computer 140 is currently visiting the website A.

Subsequently, when the user of the client computer 140 visits website B for the first time after a flash cookie has been set up for the website A in the client computer 140, the logic control module 102 will probe to determine whether the client computer 140 has stored therein any ordinary cookie of the website B. Different processing methods are used in the following two situations.

1) If this is the first visit of website B by the client computer 140 or if the website B's previously stored cookie was already deleted from the client computer 140, then the logic control module 102 will determine that the client computer 140 does not have website B's ordinary cookie. The main function module 103 will directly read website B's ordinary cookie information and then save it in website A's flash cookie.

2) If the client computer 140 visited website B before website A's flash cookie is set up and the cookie of website B is not deleted, then the browser on the client computer 140 has already saved website B's ordinary cookie in the client computer 140. The main functional module 103 will run JavaScript AC.JS through AC.SWF to read website B's ordinary cookie from the local hard drive of the client computer 140, and write it into website A's flash cookie. Although the cookies are strictly domain specific, and thus cannot be read by other websites, the cookies themselves are data saved in a user's computer. Thus, one can use other tools or software to read them. The disclosed system uses flash technology to read cookies.

Furthermore, during the visit of website B by the client computer 140, the website B's cookie stored in the flash cookie of the website A is always the latest. For instance, as mentioned in the second scenario above, when the user visits website B again, because website B's cookie information has been stored in website A's flash cookie, a comparison between website B's cookie value stored earlier in the flash cookie and the website B's current cookie value takes place. If they are the same, there is no need to store the current cookie of website B. However, if they are different, then website B's current cookie will be stored to overwrite the earlier stored cookie.

It should be noted that the determination of into which website's flash cookie the website B's cookie is to be saved can be made by the main function module 103 based on needs. In one embodiment, as the e-commerce websites A and C need to collect cookie information from the client computer 140, the program resources provided by e-commerce website A will save the website B's cookie into the website A's flash cookie based on needs.

In fact, the act of saving website B's cookie into website A's flash cookie can be considered as achieving the function of storing cookies across domains. The following texts further describe saving the website B's cookie into the website C's flash cookie merely for the purpose of illustrating the disclosed method. One can save website B's cookie into any target website's flash cookie based on the needs.

It is relatively easier to read cookie using flash. Flash allows the transfer of variables by way of URL string, and thus information of a cookie can simply be read from a browser and transferred into a flash address. Moreover, writing cookies using flash is achieved by using a combination of flash functions and JavaScript functions. In fact, using flash only to write cookies is very difficult. Here, JavaScript is further needed to set up the cookies. Processes commonly used in flash generally use FS_command but this command is not always compatible with all browsers. Some flash experts performed experiments for a design, Bookmarklets, and used Get URL commands to call JavaScript functions. By combining the Shared object function provided by flash experts, with JavaScript language, one of ordinary skills in the art may be able to write ordinary cookies of many different websites into the flash cookie of one website. It should be further noted that in existing technology, a user's local computer can have many flash cookies, and every website can have its own flash cookie stored therein. Based on the present disclosure, one can further divide flash cookies of interest, e.g., flash cookies of website A and website C, into many portions. These portions are divided according to domains, and therefore can accommodate other domain's cookies.

When the client computer 140 visits next website, i.e., the e-commerce website C, similar to the process described above, the main functional module 103 will first establish website C's flash cookie in the client computer 140. If the local hard drive of the client computer 140 has website C's ordinary cookie and this ordinary cookie has not been saved by website C's flash cookie, then the ordinary cookie of website C will be saved first into the website C's own flash cookie.

Then, based on the main functional module 103's command, AC.SWF will use JavaScript to read website B's cookie information stored in website A's flash cookie and save the website B's cookie information in website C's flash cookie using JavaScript.

This way, the website B's cookie is saved in website C's flash cookie. Thus, website C can read website B's cookie information in website C's flash cookie on the client computer 140 and thus achieve the ability of processing cookies across domain.

The disclosed method has been described using the preferred embodiments. It is thus evident that the disclosed method can be used in processing cookies across domains for many websites.

One of ordinary skills in the art is believed to be able to understand that the disclosed technique can be implemented as a method, a system, or a computer program product. Correspondingly, each of various embodiments can be implemented using hardware only or software only or a combination of hardware and software. Furthermore, the embodiments may be implemented by computer program products stored on computer-readable storage media.

The detailed description of the present disclosure using the exemplary embodiments has been presented above to explain the technical content in this disclosure and should not be construed as a limitation of the present disclosure. Without deviating from the essence and framework of the application, technicians in the art can also introduce modifications and changes in the practical implementation plan. These modifications and changes should fall within the scope of the claims.

What is claimed is:

1. A method of processing cookies across domains to allow a first website to access a cookie of a second website, the method comprising:
    providing a flash cookie of the first website in a local computer of a user; and
    reading an ordinary cookie of the second website that is stored in the local computer of the user; and
    writing the ordinary cookie of the second website into the flash cookie of the first website.

2. The method as recited in claim 1, further comprising:
    prior to providing the flash cookie of the first website in the local computer of the user, providing a resource supply module; and
    downloading program resources from the resource supply module to the local computer of the user.

3. The method as recited in claim 2, wherein the resource supply module is provided in the first website or a third website that is related to the first website.

4. The method as recited in claim 1, wherein reading the ordinary cookie of the second website that is stored in the local computer of the user comprises:
    providing a flash cookie of a third website in the local computer of the user;
    writing the ordinary cookie of the second website into the flash cookie of the third website; and
    reading the ordinary cookie of the second website from the flash cookie of the third website.

5. The method as recited in claim 1, wherein writing the ordinary cookie of the second website into the flash cookie of the first website comprises:
    comparing a value of the ordinary cookie of the second website with a value of an original cookie of the second website that has been stored in the flash cookie of the first website; and
    writing the ordinary cookie of the second website into the flash cookie of the first website and overwriting the original cookie of the second website if the value of the ordinary cookie of the second website is different from the value of the original cookie of the second website.

6. The method as recited in claim 4, wherein the providing the flash cookie and the reading and writing the ordinary cookie are implemented using program resources downloaded to the local computer of the user from a resource supply module.

7. The method as recited in claim 6, wherein the program resources comprise a program written in JavaScript language and a program written in flash.

8. A system of processing cookies across domains, the system comprising:
    a server that hosts a first website, the server configured to download program resources into a local computer of a user when the user visits the first website, the server further configured to provide a flash cookie of the first website in the local computer of the user using the program resources and to write an ordinary cookie of a second website that is stored in the local computer of the user into the flash cookie of the first website.

9. The system as recited in claim 8, wherein the server is further configured to provide a flash cookie of a third website that is related to the first website in the local computer of the user, read the ordinary cookie of the second website from the flash cookie of the first website, and write the ordinary cookie of the second website into the flash cookie of the third website.

10. The system as recited in claim 9, wherein the server is further configured to read the ordinary cookie of the second website from the flash cookie of the third website.

11. The system as recited in claim 8, wherein the server is further configured to compare a value of the ordinary cookie of the second website with a value of an original cookie of the second website that has been stored in the flash cookie of the first website, and to write the ordinary cookie of the second website into the flash cookie of the first website and overwrite the original cookie of the second website if the value of the ordinary cookie of the second website is different from the value of the original cookie of the second website.

12. The system as recited in claim 8, wherein the program resources comprise a program written in JavaScript language and a program written in flash.

13. The system as recited in claim 8, wherein the server comprises:
    a resource supply unit to download the program resources;
    a main functional unit to set up the flash cookie of the first website in the local computer of the user using the program resources, read the ordinary cookie of the second website, and write the ordinary cookie of the second website into the flash cookie of the first website; and
    a logic control unit to determine whether a local computer of one other user supports a flash cookie scheme and whether the local computer of the one other user needs to use the main functional unit.

14. One or more computer-readable storage media storing computer-executable instructions that, when executed, perform acts comprising:
    providing a flash cookie of a first website in a local computer of a user;
    reading an ordinary cookie of a second website that is stored in a flash cookie of a third website, the flash cookie of the third website being located in the local computer of the user; and
    writing the ordinary cookie of the second website from the flash cookie of the third website into the flash cookie of the first website.

15. The one or more computer-readable storage media as recited in claim 14, where the acts further comprise:
    downloading program resources to the local computer of the user prior to providing the flash cookie of the first website in the local computer of the user.

16. The one or more computer-readable storage media as recited in claim 15, wherein the acts further comprise:
    providing a resource supply module in the first website or the third website that is related to the first website, wherein the program resources are downloaded from the resource supply module.

17. The one or more computer-readable storage media as recited in claim 14, wherein reading the ordinary cookie of the second website that is stored in the local computer of the user comprises:
    providing the flash cookie of the third website in the local computer of the user;
    writing the ordinary cookie of the second website into the flash cookie of the third website; and
    reading the ordinary cookie of the second website from the flash cookie of the third website.

18. The one or more computer-readable storage media as recited in claim 14, wherein writing the ordinary cookie of the second website into the flash cookie of the first website comprises:
    comparing a value of the ordinary cookie of the second website with a value of an original cookie of the second website that has been stored in the flash cookie of the first website; and
    writing the ordinary cookie of the second website into the flash cookie of the first website and overwriting the original cookie if the value of the ordinary cookie of the second website is different from the value of the original cookie of the second website that has been stored in the flash cookie of the first website.

19. The one or more computer-readable storage media as recited in claim 17, wherein the providing the flash cookie and the reading and writing the ordinary cookie are implemented using program resources downloaded to the local computer of the user from a resource supply module.

20. The one or more computer-readable storage media as recited in claim 19, wherein the program resources comprise a program written in JavaScript language and a program written in flash.

* * * * *